May 5, 1970  A. RIESTER  3,509,810
MOTOR VEHICLE WITH PROTECTION INSTALLATION AGAINST
CONTAMINATION OF INTERIOR SPACE BY MEANS
OF ABC-WAR MATERIALS
Filed Nov. 3, 1966

INVENTOR
ALBERT RIESTER
BY  Dicke & Craig
ATTORNEYS

United States Patent Office 3,509,810
Patented May 5, 1970

3,509,810
MOTOR VEHICLE WITH PROTECTION
INSTALLATION AGAINST CONTAMI-
NATION OF INTERIOR SPACE BY
MEANS OF ABC-WAR MATERIALS
Albert Riester, Stuttgart, Germany, assignor to Daimler-
Benz Aktiengesellschaft, Stuttgart-Unterturkheim, Ger-
many
Filed Nov. 3, 1966, Ser. No. 591,871
Claims priority, application Germany, Nov. 4, 1965,
D 48,576
Int. Cl. B60j 9/00
U.S. Cl. 98—1.5                                   4 Claims

ABSTRACT OF THE DISCLOSURE

Apparatus for preventing contamination of the interior space of a passenger motor vehicle by substances such as radioactive dust, poisonous gases and other foreign substances suspended in air, including a compressed air installation supplying respirable air at a positive pressure within the passenger compartment of the vehicle.

Figure 1:
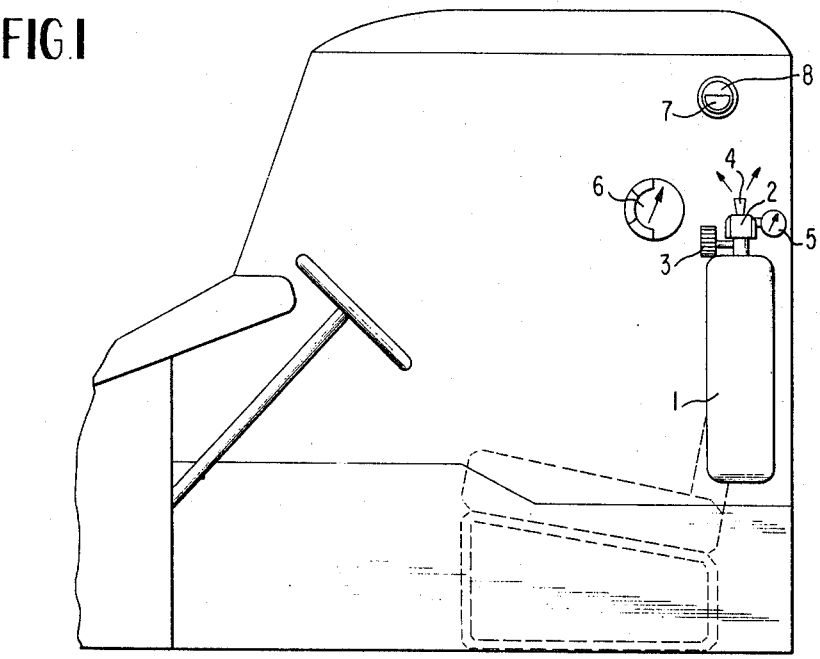

The present invention relates to a motor vehicle, especially to an operational motor vehicle for use in case of catastrophes or as military vehicle.

When operational vehicles for catastrophic events, military vehicles, or civil defense vehicles have to move about in a terrain irradiated and contaminated by ABC weapons (atomic, biological and chemical weapons), in order to carry out, for example, rescue operations, combat missions or transports vital to life, a special protection of the crew of such a vehicle is absolutely necessary.

Heretofore this protection was achieved in that the drive and escort personnel is equipped with ABC-special protective clothing as well as with protective masks which ensure a far-reaching protection against radioactive, chemical and biological weapons and war materials. Continued use of these prior art protective measures, however, cannot be expected of the personnel during longer operation in a contaminated terrain since both the driver as well as the escort personnel are impaired by the protective clothing and the protective masks in their freedom of locomotion and vision and therewith also in their operational effectiveness.

Furthermore, the known protective measures entail therebeyond the disadvantage that air contamineted with radioactive dust or with chemical or biological warfare materials penetrate during the drive through non-tight places into the driver cab or compartment, are deposited thereat, and contaminate the interior space to such an extent that the vehicle and possibly also the crew have to be pulled out of the operation for longer or shorter periods of time for purposes of decontamination.

Accordingly, the present invention aims at creating better protective conditions for the driver and escort personnel.

The present invention essentially consists in that a compressed air installation is provided for the protection against an interior space contamination by means of radioactive dust, poisonous gases, and suspended substances which supplies the interior space of the vehicle with respirable air producing an excess pressure in the vehicle interior space. In this manner completely satisfactory protection conditions are created within the vehicle which assure that neither radioactive dust nor contaminated atmospheric air is able to penetrate into the interior space of the vehicle.

Provision may also be made in an advantageous manner that the pressurized air protective installation is equipped with a regulating means for maintaining constant the excess pressure within the vehicle interior space. This regulating installation may be constituted in a simple manner by an excess pressure valve installed into the wall closing off the vehicle interior space against the outside and provided with a safety check valve cap arranged on the outside. For purposes of increasing the safety, the vehicle interior space may additionally be equipped also with a pressure control system, for example, with a built-in pressure-measuring apparatus for monitoring the air pressure.

An appropriate and simple construction of the motor vehicle according to the present invention results if the compressed air protection installation consists essentially of one or several compressed air tanks containing respirable compressed air and including a pressure-reducing valve. Depending on the requirements and conditions, it is also possible to constructionally couple the compressed air protection installation with a ventilation installation already present in the vehicle, if the compressed air protection installation essentially consists of a blower or compressor provided with a filtering installation whereby the filtering installation is composed of a pre-filter and a space filter. The blower or compressor and the filter installation may also be constructively coupled by any conventional means in a simple manner with the conventional vehicle ventilation installation by way of an air distribution line.

Accordingly, it is an object of the present invention to provide a protection installation for operational motor vehicles which eliminates by simple and relatively inexpensive means the shortcomings and drawbacks encountered with the prior constructions.

Another object of the present invention resides in a protective installation for operational motor vehicles which assures completely satisfactory protection to the driver and passengers of the vehicle against contamination resulting from radioactive, biological or chemical warfare, yet does not impair the freedom of locomotion and good visibility on the part of the vehicle crew.

A further object of the present invention resides in a protection installation for operational motor vehicles which prevents the penetration of materials and substances harmful to the crew during operational use of the vehicle in contaminated areas.

Another object of the present invention resides in a motor vehicle of the type described above which affords unobjectionable protection to the crew of the vehicle without requiring protecting clothing and/or protective masks for the crew members.

Still a further object of the present invention resides in a vehicle for use in combat missions, rescue operations and the like within contaminated terrains which is equipped with a protection installation that obviates the need for subsequent decontamination of the interior of the vehicle and/or the clothing of the crew.

Figure 2:
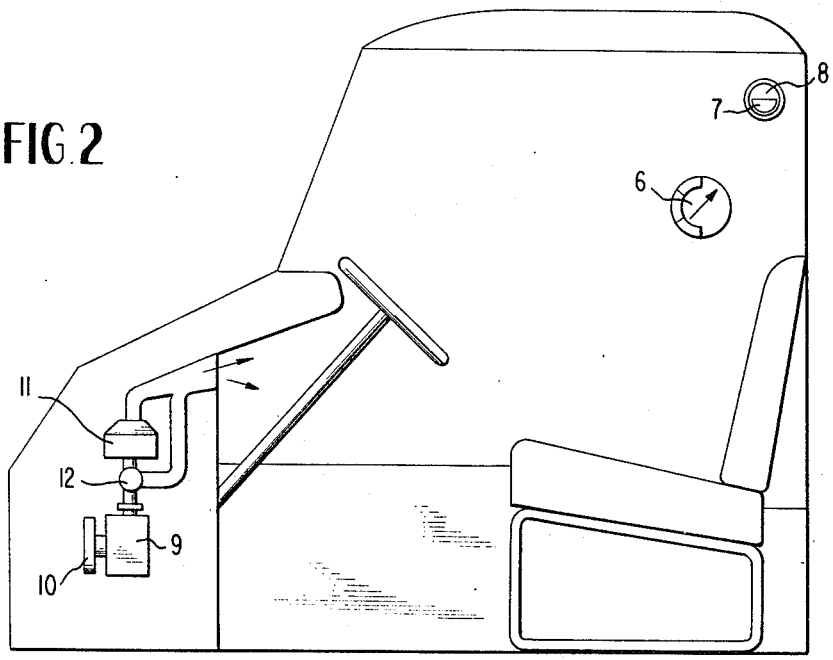

These and further objects, features, and advantages of the present invention will become obvious from the following description when taken in connection with the accompanying drawing, which shows, for purposes of illustration only, two embodiments in accordance with the present invention, and wherein:

FIGURE 1 is a somewhat schematic partial elevational view of one embodiment of a compressed-air protection installlation in the driver cab of a motor vehicle in accordance with the present invention which utilizes respirable compressed air from compressed air containers, and FIGURE 2 is a somewhat schematic partial elevational view, similar to FIGURE 1, of a modified embodiment of a pressurized air protection installation in accordance with the present invention utilizing filtered atmospheric air.

Referring now to the drawing, wherein like reference numerals are used throughout the two views to designate like parts, and more particularly to FIGURE 1, reference numeral 1 designates therein a container containing respirable compressed air which is arranged either fixedly or interchangeably within the driver cab or compartment of a motor vehicle of any suitably known construction. The compressed air which is under high pressure is reduced to a lower pressure by means of a conventional reducing valve 2 so that a controllable discharge or escape of the respirable air is made possible by actuation of the discharge cock 3 by way of the discharge aperture 4. A measuring gauge 5 indicates at all times the content in the compressed air tank 1. Additionally, a pressure measuring instrument 6 is arranged in the interior space of the driver cab by means of which the pressure conditions prevailing in the interior space can be continuously monitored. An excess pressure valve 7 of any conventional construction and built into the outer wall of the vehicle cab or compartment prevents an undesired increase of the atmospheric pressure within the interior space of the driver cab or compartment. A safety rapid-closure cap 8, also of any conventional construction, is operatively connected with the excess pressure valve 7 which cap prevents an inflow of atmospheric air that may occur in a shock-like or sudden manner, into the interior of the driver cab or passenger compartment. Since both the excess pressure valve 7 as well as the safety rapid-closure cap 8 may be of any suitable construction, known per se in the prior art, details thereof are not disclosed herein.

An increased air pressure results in the driver cab or compartment by the outflow of respirable compressed air out of the tank 1 which increased air pressure permits the air quantity disposed within the interior space to flow toward the outside through the existing untight or leaky places of the driver cab or compartment. The excess pressure produced in the driver cab or compartment is maintained constant by the compressed air protection installation of the present invention. The entry of air from the outside and the penetration of radioactive dust, contaminated air and the like is made impossible in this manner.

Apart from the requirements to be able to close off the normal supplies or feeds for air and heated air and to close larger floor apertures, no further measures are necessary to seal the space of the vehicle cab air-tight against the outside. The normal air permeability technically conditioned in motor vehicles, for example, at windows and doors in the driver cab or compartment instead becomes a component of the described system of an excess-pressure air-protection installation. An expensive total or complete sealing of the driver car or compartment which can be realized only with difficulties from a technical point of view, becomes superfluous. Furthermore, the normal ventilation of the vehicle can again be re-established after termination of an ABC operational use and without technical expenditures.

With the embodiment illustrated in FIGURE 2, the outside air is forced by way of a fan or compressor 9 into the interior space of the driver cab or compartment by way of a space filter 11, whereby a dust filter 10 is connected ahead of upstream of the fan or blower 9. The air pressure within the space can be constantly monitored by means of the measuring apparatus in a manner similar to the embodiment of FIGURE 1. The excess pressure valve 7 with the safety rapid closure cap regulates the desired constant excess pressure in the interior space.

If the compressed air protection installation illustrated in FIGURE 2 is operatively connected and coupled by any conventional means with a vehicle ventilation installation of an air distributor line 12 becomes necessary.

While I have shown and described two embodiments in accordance with the present invention, it is understood that the same is not limited thereto but is susceptible of numerous changes and modifications as known to a person skilled in the art and I therefore do not wish to be limited to the details shown and desiribed herein but intend to cover all such changes and modifications as are encompassed by the scope of the appended claims.

I claim:

1. In combination with a land surface vehicle having body means capable of completely enclosing a space adapted for passengers, the improvement comprising, pressurized air means for supplying to said space a respirable air and producing a pressure in excess of ambient pressure, pressure regulating means for controlling the pressure within the space, and rapid closure means for preventing an inflow of ambient air that might occur in a shock-like or sudden manner.

2. The improvement according to claim 1, wherein said pressure regulating means includes excess pressure valve means, installed into a wall of the vehicle closing off the interior space, said rapid closure means being provided on the outside of said excess pressure valve means.

3. The improvement according to claim 1, further comprising pressure measuring apparatus for monitoring the pressure within the vehicle interior space.

4. The improvement according to claim 1, wherein said pressurized air means includes tank means containing respirable compressed air and pressure-reducing valve means.

References Cited

UNITED STATES PATENTS

| 1,461,700 | 7/1923 | Nichols | 98—1.5 |
| 2,203,477 | 6/1940 | Wahlberg | 98—2.4 |
| 2,396,116 | 3/1946 | Noxon | 98—1.5 |
| 2,614,654 | 10/1952 | Strinden | 98—2 |
| 3,215,057 | 11/1965 | Turek | 98—1.5 |

MEYER PERLIN, Primary Examiner

U.S. Cl. X.R.

98—2